Inventors
R.F. Winstone, D. Wilkinson,
W.T. Scarr, G.B. Dymock,
R.I. Bishop

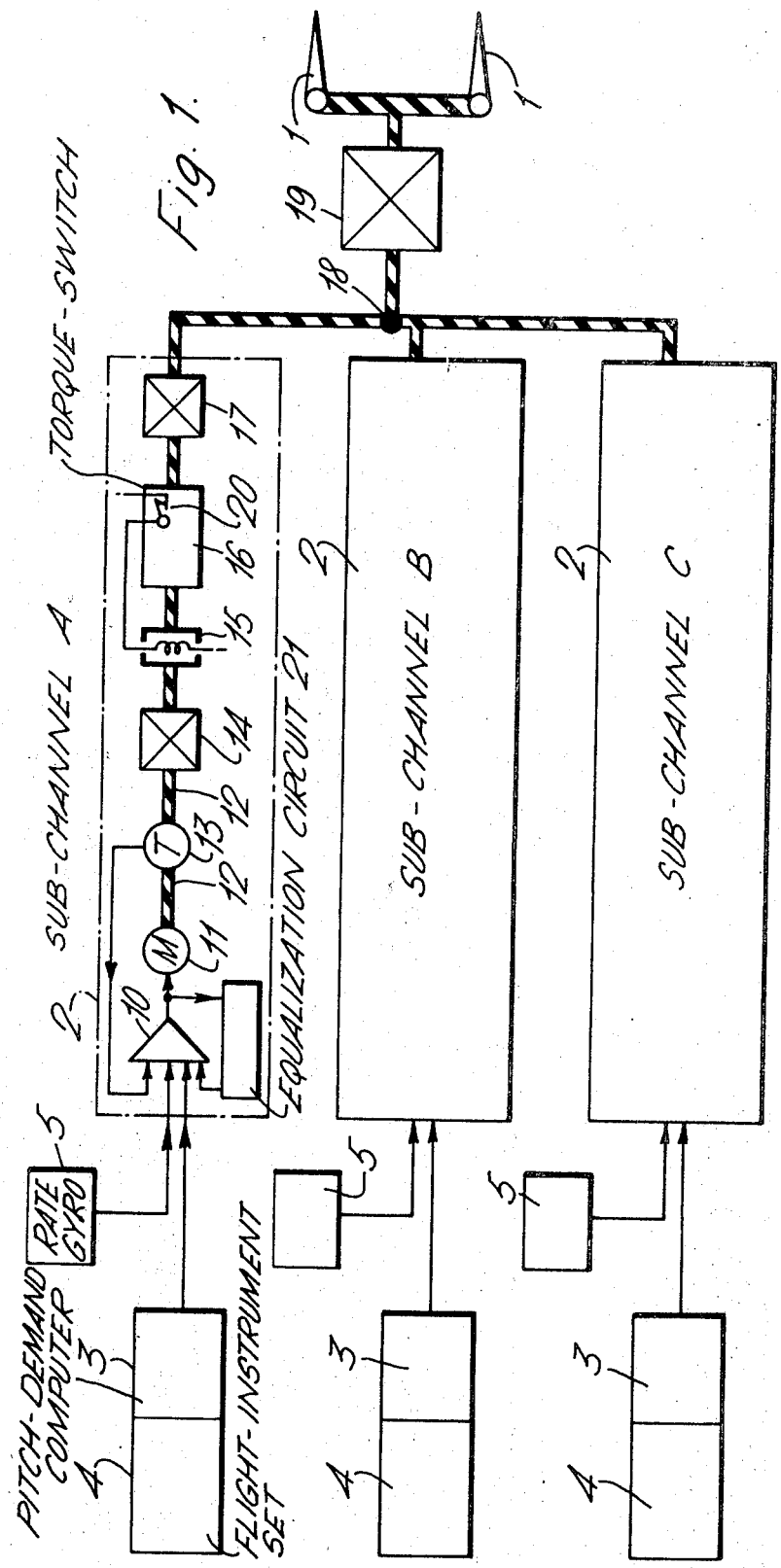

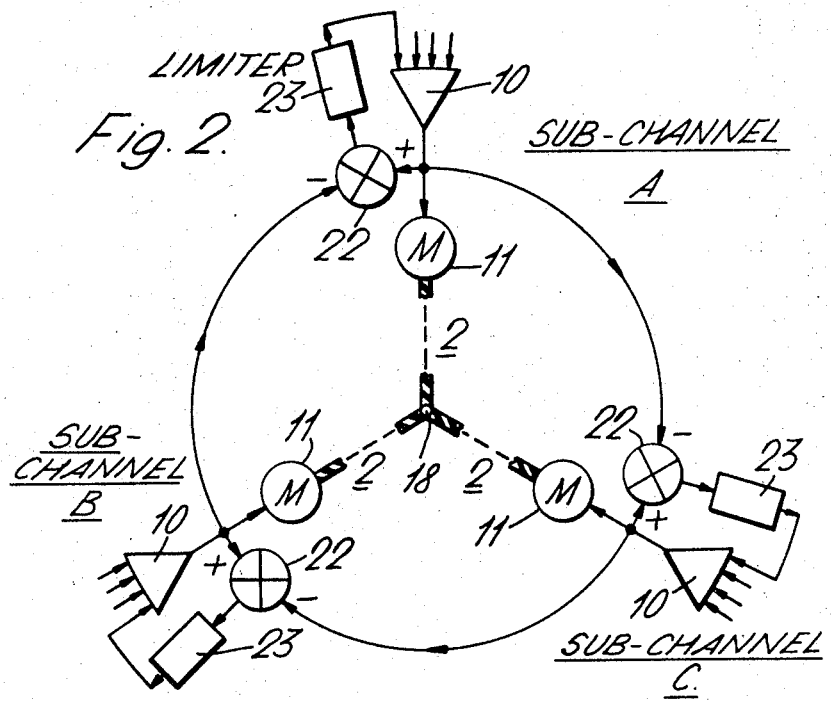
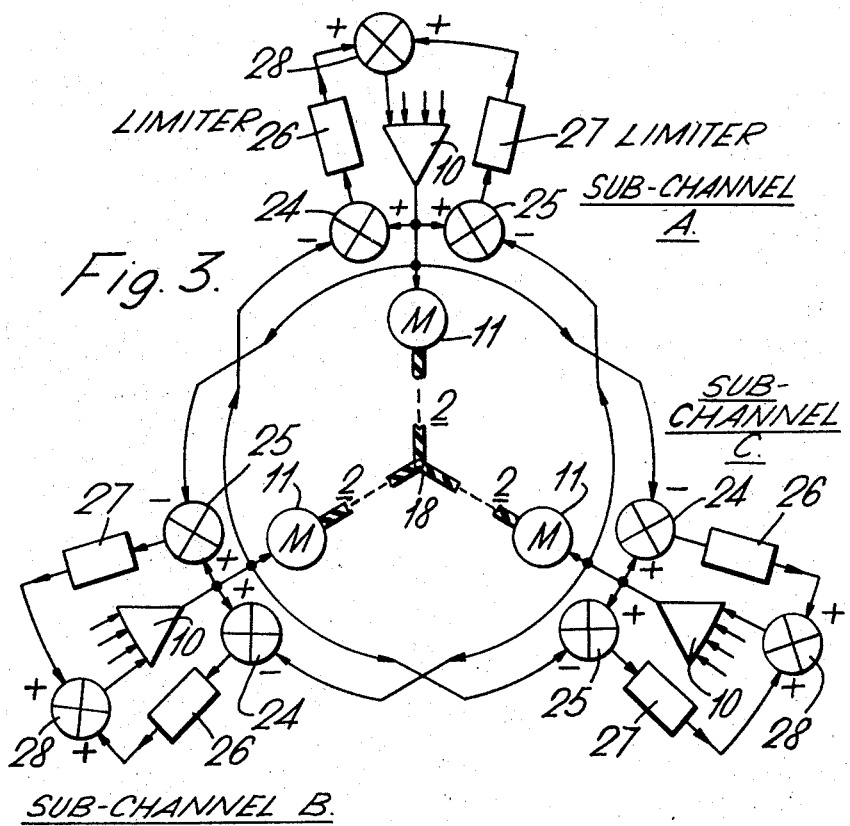

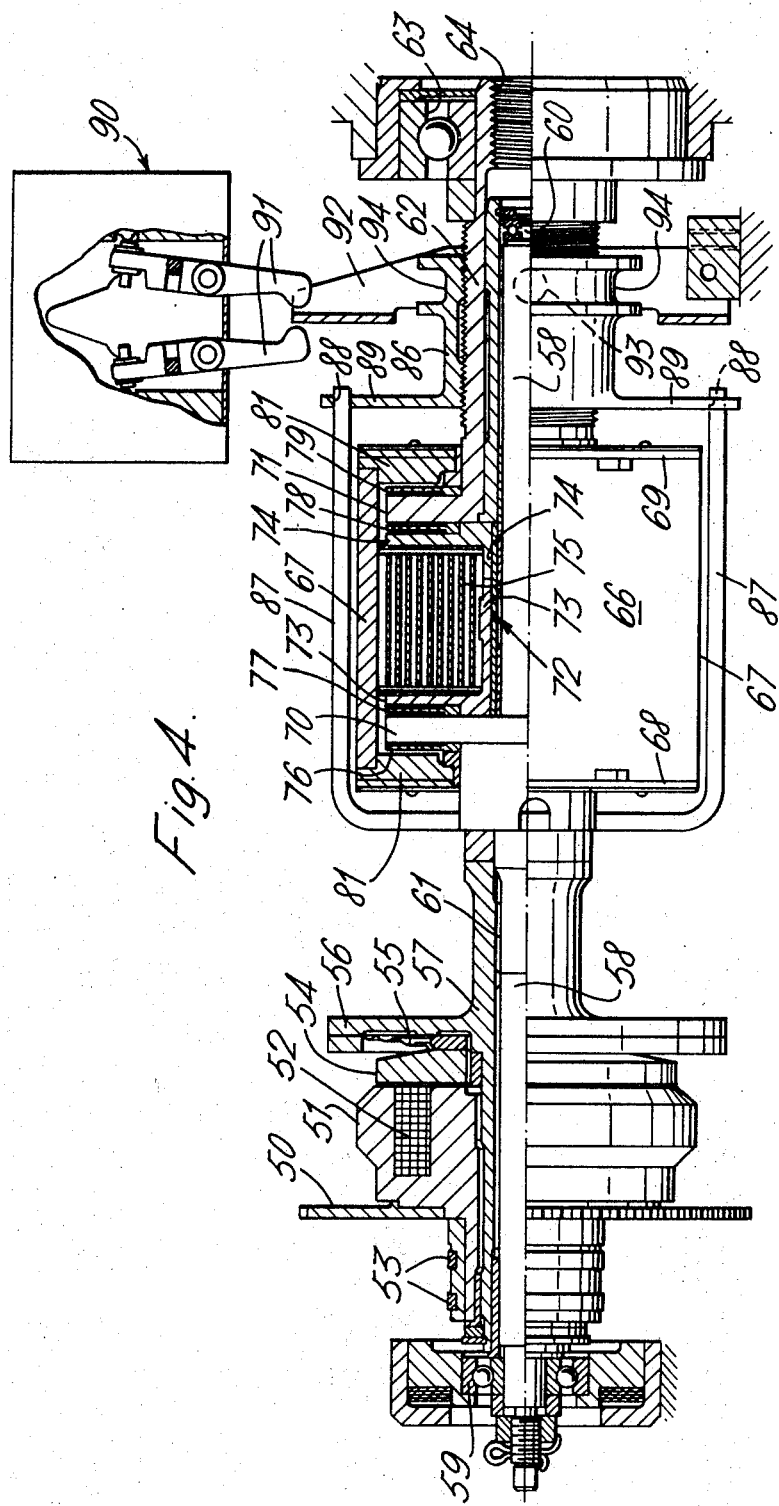

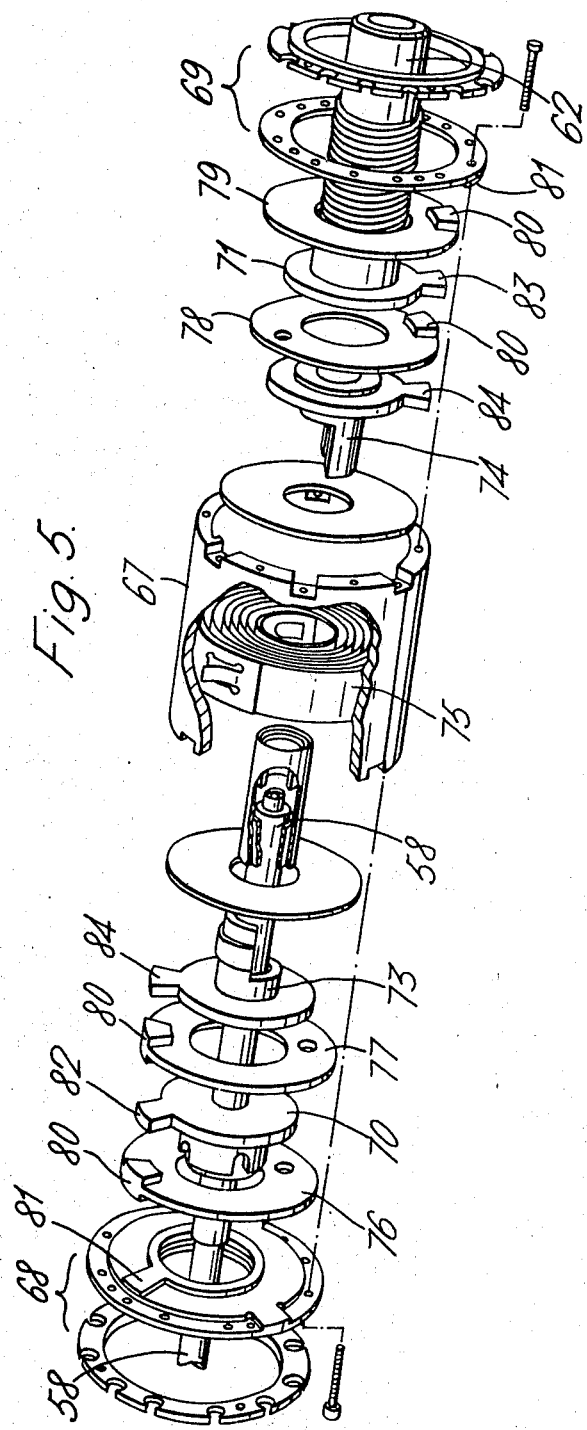

By Hall, Pollack & Vande Sande
Attorney

Inventors
R. F. Winstone, D. Wilkinson,
W. T. Scarr, C. B. Dymock,
R. I. Bishop
By Hall, Pollack & Vande Sande
Attorneys Sept. 22, 1970  R. F. WINSTONE ET AL  3,529,704
LOST-MOTION COUPLING DEVICES
Filed Oct. 9, 1968  7 Sheets-Sheet 7

Inventors
R. F. Winstone, D. Wilkinson,
W. T. Scarr, C. B. Dymock,
R. I. Bishop
By Hall, Pollack & VandeSande
Attorneys

United States Patent Office 3,529,704
Patented Sept. 22, 1970

1

3,529,704
LOST-MOTION COUPLING DEVICES
Ronald Francis Winstone, 11 Priory Terrace, Gloucestershire; Derek Wilkinson, 88 Station Road, Bishops Cleeve; William Theodore Scarr, 34 Greenway, Woodmancote; Colin Bartley Dymock, Eastfield, Noverton Lane, Prestbury; and Roger Ivan Bishop, Bryher, 28 Meadoway, Bishops Cleeve, all of Cheltenham, England
Filed Oct. 9, 1968, Ser. No. 766,150
Claims priority, application Great Britain, Oct. 10, 1967, 46,336/67
Int. Cl. F16d 7/00; B64c 17/06
U.S. Cl. 192—55                    20 Claims

ABSTRACT OF THE DISCLOSURE

A lost-motion coupling device has input and output shafts intercoupled through coaxial spool and barrel members that are urged to rotate oppositely by a preloaded spiral-spring. Catch-plates engaging between each shaft and member arrest rotation of each member relative to both shafts so that relative shaft-rotation occurs only when input torque overcomes the spring-preloading. Extended relative shaft-rotation actuates a switch to break energization of an electromagnetic clutch that is coupled in series with the lost-motion device in an aircraft flight-control system.

---

This invention relates to lost-motion coupling devices.

According to the present invention a lost-motion coupling device comprises two rotatably-mounted coupling-parts, two intermediate members, means mounting the two intermediate members for rotation independently of one another and said two coupling-parts, first catch means rotatably-mounted to act between a first of said coupling-parts and said two intermediate members, said first catch means having abutments engageable by said intermediate members for carrying said first catch means with the respective intermediate members into driving engagement with said first coupling-part, second catch means rotatably-mounted to act between the second coupling-part and said two intermediate members, said second catch means having abutments engageable by said intermediate members for carrying said second catch means with the respective intermediate members into driving engagement with said second coupling-part, and spring means coupled to both said intermediate members for urging relative rotation between them to bring each into engagement with the said abutments of said first and second catch means and thereby establish driving interconnection of said first and second coupling-parts via said catch means and intermediate members, said driving interconnection being broken to allow relative rotation between the two coupling-parts only in response to torque applied between them sufficient to overcome the action of said spring means.

One of the intermediate members may be a cylindrical barrel and the other a spool mounted within the barrel. In these circumstances the spring means may be a spiral spring embracing the spool within the barrel and having its two ends attached to the spool and barrel respectively. Further, the two coupling-parts may be rotatably-mounted shafts that extend into the barrel from opposite ends.

The lost-motion coupling device of this invention may find application in automatic control systems, and especially, in automatic control systems of the kind in which multiplex techniques are used.

An automatic control system which uses multiplex techniques and which includes a form of lost-motion coupling device in accordance with the present invention, will now be described, by way of example, with reference to the accompanying drawings, in which:

2

FIG. 1 is a schematic representation of the automatic control system;

FIGS. 2 and 3 are simplified schematic representations of the automatic control system shown in FIG. 1, for providing illustration of alternative arrangements used in equalization of the system;

FIG. 4 is a sectional side-elevation of an assembly of a clutch and torque-switch, which is for use in each of three sub-channels of the automatic control system of FIG. 1, and which includes a lost-motion coupling device in accordance with the present invention;

FIG. 5 is an exploded perspective view of the lost-motion coupling device;

Figure 6:
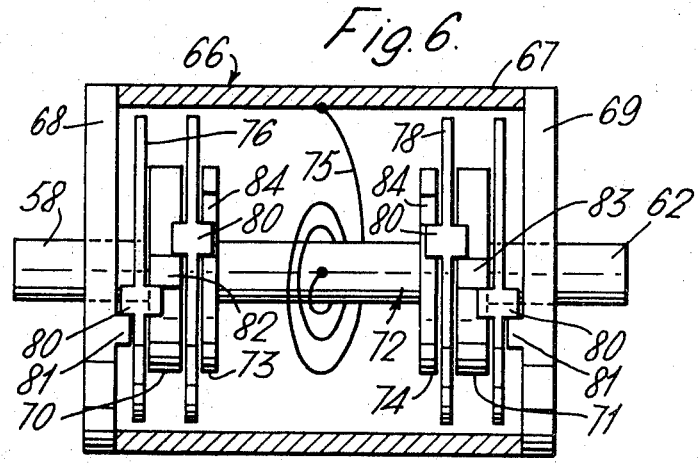

FIG. 6 is a schematic representation of the lost-motion coupling device shown in FIG. 5; and FIGS. 7 and 8 each illustrate in the schematic format of FIG. 6, successive stages of operation of the lost-motion coupling device, the successive stages for one operative condition being illustrated by different parts A to D of FIG. 7, and for an alternative operative condition being illustrated by different parts A to D of FIG. 8.

The automatic control system to be described is a triplex system for use in controlling flight of an aircraft, the system being coupled to the elevator control-surfaces of the aircraft to control the aircraft in pitch during, for example, an automatic-landing manoeuvre.

Referring to FIG. 1, the angular setting of a pair of elevator control-surfaces 1 is controlled by a control-channel consisting of three nominally-identical sub-channels 2 that operate in parallel with one another and are herein differentiated from one another by the letters A, B and C. The three sub-channels 2 control movement of the surfaces 1 in accordance respectively with signals that are supplied from three nominally-identical pitch-demand computers 3, each such signal being representative of a demand for rate of change of pitch attitude of the aircraft. The demand signal is in each case derived from the signals supplied by a respective one of three nominally-identical sets 4 of flight instruments.

Each flight-instrument set 4 includes inter alia, a vertical gyroscope, a glide-path radio receiver and a radio altimeter, and the signals supplied by the instruments of the set are utilized selectively in the relevant pitch-demand computer 3 according to the setting of a flight-controller (not shown). The flight-controller, which is common to all three sub-channels 2, is set by the pilot of the aircraft in accordance with the mode of flight desired and in each pitch-demand computer 3 is associated with a switching circuit that is switchable from one to another of a plurality of states to change the mode of operation of the respective computer 3. When, for example, the flight-controller is set by the pilot to select automatic landing of the aircraft, each switching circuit is thereby primed ready to execute a switching sequence in which the successive steps of the sequence take place as the aircraft descends through successive height-levels above the ground. The automatic landing manoeuvre is executed in discrete phases that follow on one after the other as the aircraft descends through these height-levels, and once the manoeuvre is initiated by the pilot, so the successive steps of the switching sequence bring about the changes from one phase to another in the operational mode of the pitch-demand computer 3. The control law according to which the demand is derived is changed from one phase to another by the switching operation, the descent of the aircraft to the appropriate height-level for the change, being detected in each case by reference to the output signal of the radio altimeter in the associated flight-instrument set 4. Details of the switching circuits, and the manner in which they operate and are coordinated to one another so that switching takes place simultaneously in the three computers 3, are described in British patent specification No. 986,137.

The three nominally-equivalent demand-signals applied from the computers 3 to the respective sub-channels 2, are opposed respectively by the signals supplied by three nominally-identical rate-gyroscopes 5. Each rate-gyroscope 5 is mounted in the aircraft to sense the actual rate of change of pitch altitude of the aircraft, and the signals supplied by the three rate-gyroscopes 5 provide nominally-equivalent measures of this rate. The three sub-channels 2 act in concert to drive the elevator surfaces 1 in a manner to maintain substantial equality between the pitch-rate demanded by the computers 3 and the actual pitch-rate sensed by the rate-gyroscopes 5, so as thereby to comply with the demand.

Each sub-channel 2 includes a servo-amplifier stage 10 that receives the signals from the relevant computer 3 and rate-gyroscope 5, and derives therefrom a command for rate of movement of the elevator control-surfaces 1. A servo-motor 11 having a shaft 12 coupled to a tacho-generator 13, is energized in accordance with this command. The signal derived by the tacho-generator 13, which signal is in accordance with the rate of rotation of the shaft 12, is supplied to the amplifier stage 10 as degenerative feedback, and in this way the rate of rotation of the shaft 12 is maintained at a value dependent upon the command.

The shaft 12 is coupled via reduction gearing 14 and an electromagnetic clutch 15 to a torque-switch 16, and from there is coupled through further reduction gearing 17 to a mechanical coupling point 18 common to all three sub-channels 2. The combined drive applied from the three sub-channels 2 to the common point 18 is conveyed to the control-surfaces 1 via further reduction gearing 19.

Engagement of the channel to control the elevator control-surfaces 1 automatically, is effected by operation of energization circuits of the individual electromagnetic clutches 15. Details of these circuits and the manner in which they operate, are described in British patent specification No. 901,458, and it is sufficient here simply to refer to the fact that the energization circuit of the clutch 15 in each sub-channel 2 includes electrical coupling to the torque-switch 16 of that same sub-channel.

Each torque-switch 16 is a mechanical device that provides a substantially-solid coupling between the clutch 15 and gearing 17 of its sub-channel 2, as long as the torque-loading on the device remains below a pre-set threshold level. An electrical switch 20 in the device is actuated in response to sustained loading in excess of this threshold level, actuation of the switch 20 breaking the energization circuit of the electromagnetic clutch 15 in the relevant sub-channel 2, and thereby disengaging this sub-channel 2 from control of the control-surfaces 1.

The torque-loading experience by the torque-switch 16 in any one of the three sub-channels 2 exceeds the theshold level if the output drive of that particular sub-channel 2 differs significantly from the output drives of the other two sub-channels. These latter circumstances arise from fault conditions in the sub-channel 2 itself, or in the equipment individually associated therewith, and the response of the torque-switch 16 appropriately results in disengagement of this sub-channel 2 from control of the control-surfaces 1. There are, however, differences in the output drives of the three sub-channels 2 that arise during normal operation from inherent inequalities as between the nominally-identical sub-channels 2 themselves, and from inequalities between the nominally-identical signals supplied to them. Steps are taken to eliminate these acceptable differences using an equalization circuit 21 with each of the sub-channels 2.

Equalization to balance out the acceptable differences is provided by the circuits 21 either in the manner described in British patent specification No. 1,003,567, as illustrated schematically in FIG. 2 of the present drawings, or preferably, in the manner described in co-pending British patent application No. 44,071/68, as illustrated schematically in FIG. 3 of these drawings. In both instances the equalizaiton is provided in dependence upon the energization voltages supplied to the motors 11 by the amplifier stages 10, the voltage in each case providing a measure of the torque exerted by the relevant motor 11. With the cyclic-equalization arrangement of FIG. 2, each sub-channel 2 includes a comparator 22 that acts to compare the motor-energization voltage in its own sub-channel 2 with the corresponding voltage from the next sub-channel 2 taking the three sub-channels A, B and C in cyclic order; the comparator 22 derives a signal representative of the difference between the compared signals and supplies this via an associated limiter 23 to provide a basic equalization signal for the respective sub-channel. With the preferred symmetrical-equalization arrangement of FIG. 3, on the other hand, each sub-channel 2 includes two comparators 24 and 25 that serve to compare the motor-energization voltage of the sub-channel 2 with the corresponding voltages respectively of the other two sub-channels 2; the comparators 24 and 25 derive signals representative of the respective differences and supply these via individually-associated limiters 26 and 27 to be combined by an adder 28 into a basic equalization signal for the respective sub-channel.

In each of the arrangements of FIGS. 2 and 3, the derived equalization signal is, as shown, supplied degeneratively to the amplifier stage 10 of the respective sub-channel 2, so as to correct specifically for short-term differences between the datum voltage-levels of the individual energization signals supplied from the amplifier stages 10 to the motors 11, that is to say, to correct for differences arising between the motor-energization voltages as a result of short-term variations in their notional zero-levels. The equalization signal is also supplied (not shown) in the sub-channels 2 to provide three other forms of equalization, namely long-term datum equilization, gain equalization and input-gain equalization. Long-term datum equalization is provided by integrating with respect to time the basic equalization signal and applying the derived integral to the amplifier stage 10 degeneratively, whereas gain-equalization is provided by applying the equalization signal to regulate degeneratively the degree of rate-feedback (and therefore the overall gain of the servo) provided from the tacho-generator 13. Finally, input-gain equalization is provided in each sub-channel 2 by using the basic equalizing signal to regulate degeneratively the comparative magnitudes of the demand signal supplied by the pitch-demand computer 3 and the signal supplied by the rate-gyroscope 5.

The full equalization provided as described above with reference to FIGS. 2 and 3, is such as to ensure that normal differences arising between the nominally-identical sub-channels 2 of the system of FIG. 1 are balanced out, and in particular that there are no continuous, long-term differences between the torque outputs from the three motors 11. However, the steps taken are necessarily of somewhat limited effect as regards transient inequalities of short period arising between the sub-channels 2. In particular, transients having, for example, periods less than one-hundred milliseconds, may not be entirely balanced-out and accordingly may result in significant differences between the output drives of the sub-channels 2; however it is arranged by use of the mechanism of the present invention, that such short-term transients do not result in unnecessary disengagements of the sub-channels 2.

In the latter respect, each torque-switch 16 is arranged to provide for actuation of its cut-out switch 20 only when it experiences a torque-loading that is sustained in excess of the threshold level for a substantial period, in particular for a period longer than applicable to the normally-experienced short-period transients. To this end each torque-switch 16 allows for a degree of relative rotation between the output shaft of the clutch 15 and the input shaft to the gearing 17 under torque-loading in excess of the threshold level, and provides for actuation of its cut-out switch 20 only after a substantial, preset angle of relative rotation has been experienced. Short-period transients are ineffective to produce this preset angle of relative rotation, and accordingly do not result in disengagement of the sub-channels 2. On the other hand, a fault condition gives rise to a sustained torque-loading that is effective to actuate the cut-out switch 20, and thereby disengage the relevant sub-channel 2.

In general, the angle of relative rotation at which actuation of the cut-out switch 20 takes place is set to be as large as possible consistent with safety for the particular mode of flight involved.

An assembly of an electromagnetic clutch and torque-switch that may be used to provide the clutch 15 and torque-switch 16, together with the gearing 14 and 17, in each sub-channel 2 of the system of FIG. 1, is shown in FIG. 4.

Referring to FIG. 4, input drive to the assembly is applied from the servo motor 11 of the relevant sub-channel 2 to an input gear 50 that is secured to a rotatably-mounted yoke 51 of the electromagnetic clutch. Current is supplied to an energizing coil 52 of the yoke 51 via slip-rings 53 that are carried with the yoke 51.

Output drive from the electromagnetic clutch is taken from an armature 54 that is clamped to the inner peripheral portion of a corrugated, resilient angular-diaphragm 55. The outer peripheral portion of the diaphragm 55 is clamped to the flange 56 of a tubular carrier 57. The diaphragm 55 permits axial movement of the armature 54 relative to the carrier 57 during engagement and disengagement of the electromagnetic clutch, and at the same time provides, by virtue of a degree of preloading, spring bias that ensures positive disengagement when energization of the coil 52 ceases.

The carrier 57 and yoke 51 are both coaxial with a main shaft 58 that extends substantially the whole length of the assembly and is rotatably-mounted at either end within ball-bearings 59 and 60. The yoke 51 is rotatably-mounted on the carrier 57, whereas the carrier 57 is secured to the shaft 58 by splines 61. The output drive of the clutch is accordingly applied to the shaft 58, and from the shaft 58 is applied to the torque-switch of the assembly. The torque-switch has a tubular output-shaft 62 that is rotatably-mounted on the shaft 58 and within a ball-bearing 63. The open end of the shaft 62 within the ball-bearing 63 is provided with an internal thread 64 so as to allow for an external output-connection to be made to the assembly.

The shafts 58 and 62 are intercoupled through a lost-motion device of the torque-switch. The lost-motion device as shown also in FIG. 5, is enclosed within a cylindrical barrel 66 formed by a cylindrical shell 67 and two identical end-caps 68 and 69, the end-caps 68 and 69 being clamped together upon the shell 67 and being rotatably-mounted on the shafts 58 and 62 respectively. Within the barrel 66 the shafts 58 and 62 have flanges 70 and 71 respectively, that are separated axially from one another by a double-flanged spring-spool 72 rotatably-mounted on the shaft 58. The spool 72 is formed by two similar and axially-interfitting, flanged spool-parts 73 and 74, and holds a guarded spiral-spring 75. The inner end of the spring 75 is attached to the spool-part 73 whereas the outer end is attached to the shell 67 of the barrel 66.

The spring 75 is preloaded and thereby tends to produce rotation of the barrel 66 and spool 72 in opposite directions to one another. Such rotation is restrained by virtue of four identical and rotatably-mounted catch-plates 76 to 79 that each have a transversely-extending lug 80 and are respectively interposed between the end-cap 68 and flange 70, the flange 70 and the spool-part 73, the spool-part 74 and the flange 71, and the flange 71 and the end-cap 69. The manner in which the catch-plates 76 to 79 act in this respect, will explain more particularly with reference to FIG. 6. FIG. 6 is a schematic representation of the lost-motion device as seen with the shell 67 partly cut away.

Referring to FIG. 6, the spring 75 acts on the barrel 66 in a sense to urge laterally-extending lugs 81 on the end-caps 68 and 69 against the lugs 80 of the catch-plates 76 and 79 respectively. The lugs 80 of the catch-plates 76 and 79 in their turn are urged against radially-extending lugs 82 and 83 of the flanges 70 and 71 respectively. At the same time the action of the spring 75 on the spool 72 urges radially-extending lugs 84 of the spool-parts 73 and 74 against the lugs 80 of the catch-plates 77 and 78, and these lugs 80, in their turn, engage with the lugs 82 and 83. The action of the spring 75 on the barrel 66 is thereby opposed at the flanges 70 and 71 by its equal and opposite action on the spool 72. The result of this is that until a torque-loading sufficient to overcome the preloading of the spring 75 is applied to the lost-motion device (either from the shaft 58 or from the output shaft 62), there is in effect a substantially solid coupling between the two shafts 58 and 62.

When torque-loading sufficient to overcome the preloading of the spring 75 is applied to the lost-motion device there is relative rotation between the shafts 58 and 62 from the normal relative orientation represented in FIG. 6. This relative rotation, irrespective of sense winds up the spring 75 and thereby increases the resilient opposition to the applied torque. The full range of possible relative rotation between the shafts 58 and 62 is some 640 degrees, and the manner in which this is achieved will now be described briefly with reference to FIGS. 7A to D and 8A to D.

FIGS. 7A to D illustrate schematically successive stages through the range for one sense of relative rotation, and FIGS. 8A to D the corresponding stages for the other sense. In describing each stage it will be assumed that torque is being applied to the shaft 58 and that the shaft 62 is locked solid, the sense of the torque being indicated in the relevant figure by an appropriately-directed arrow embracing the shaft 58; however, the stage as illustrated is in each case equally-applicable to the circumstances in which the shaft 58 is locked solid and the torque is applied to the shaft 62 in the correspondingly-indicated opposite sense.

Figure 7A:
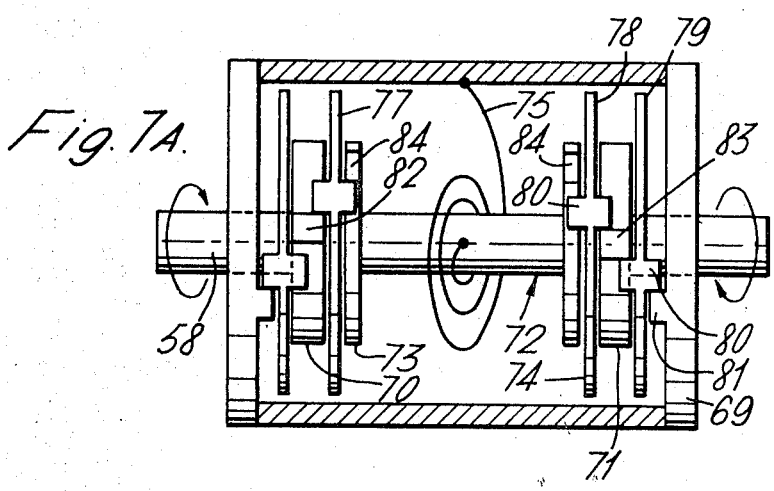

Referring to FIG. 7A, application to the shaft 58 of sufficient torque to overcome the preloading of the spring 75 allows the shaft 58 to rotate and carry with it the spool 72. In this latter respect, the lug 82 on the flange 70 acts upon the lug 80 of the catch-plate 77 engaged with the lug 84 of the spool-part 73. The rotation of the spool 72 is in the sense to wind up the spring 75 and break engagement between the lug 84 of the spool-part 74 and the lug 80 of the catch-plate 78. Rotation of the barrel 66 is restrained by the lug 80 of the catch-plate 79 interposed between the lug 81 of the end-cap 69 and the lug 83 of the stationary flange 71.

Rotation of the shaft 58 and spool 72 together under increasing applied torque, continues with the same regime as illustrated in FIG. 7A up to approximately 300 degrees. After this the lug 82 engages the lug 80 of the catch-plate 76, and the lug 84 on the spool-part 74 engages the lug 80 of the catch-plate 78, as illustrated in FIG. 7B.

Figure 7B:
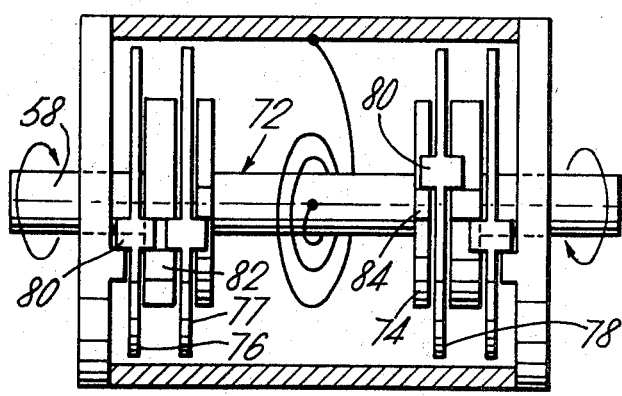
Figure 7C:
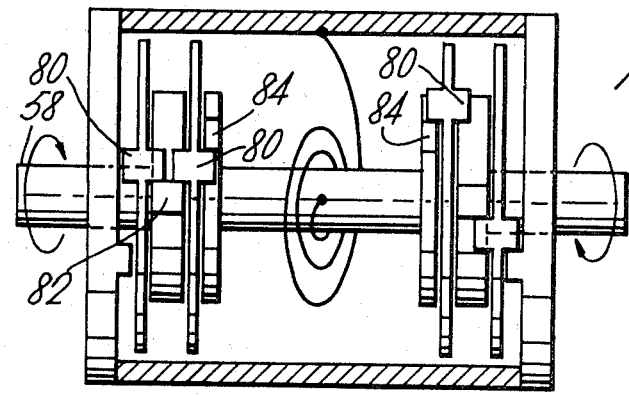

From the regime of FIG. 7B, the spool 72 and catch-plates 76 to 78 rotate with the shaft 58, the regime after rotation of the shaft 58 through one revolution being as illustrated in FIG. 7C.

Figure 7D:
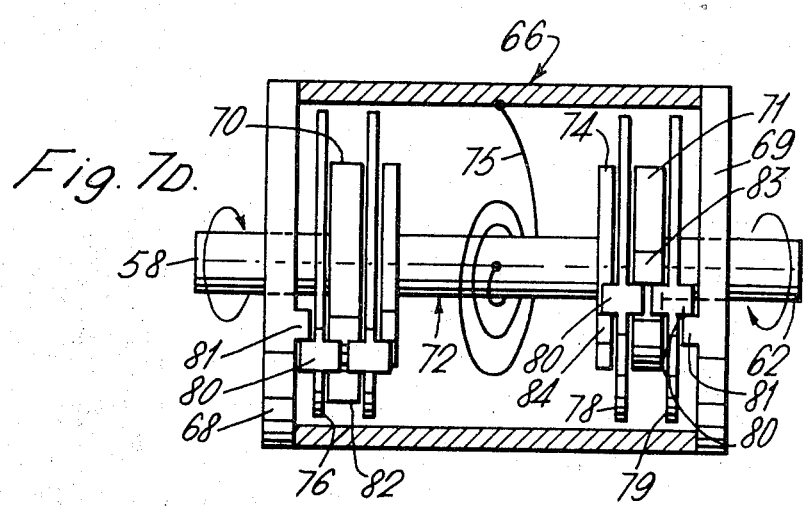

When the shaft 58 has rotated through some 640 degrees, the lug 80 of the catch-plate 76 engages with the lug 81 of the end-cap 68, and the lug 80 of the catch-plate 78 engages with the lug 83 of the flange 71, as illustrated in FIG. 7D. Further rotation of the shaft 58 in the same sense relative to the shaft 62 is not possible; the barrel 66 is restrained from rotation in this sense by the lug 80 of the catch-plate 79 interposed between the lug 81 of the end-cap 69 and the lug 83 of the flange 71, and the spool 72 is restrained from rotation in the same sense by the lug 80 of the catch-plate 78 interposed between the lug 84 of the spool-part 74 and the lug 83 of the flange 71.

Figure 8A:
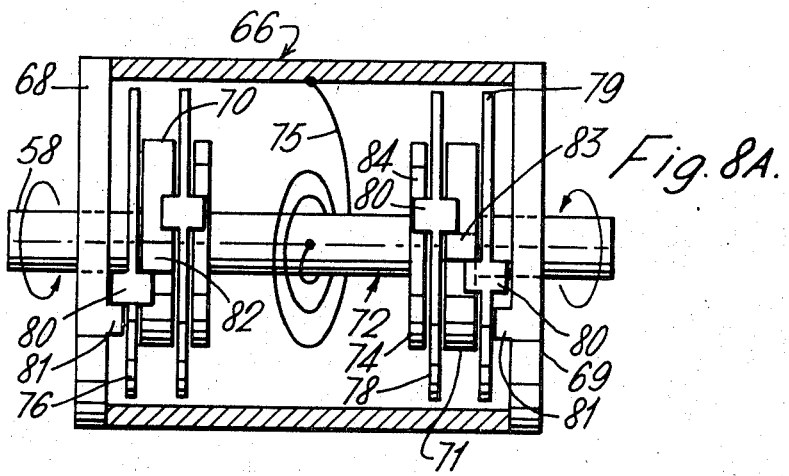

When the sense of torque applied to wind up the spring 75 is opposite to that applied in the case of FIGS. 7A to D, the initial regime, as illustrated in FIG. 8A, is one in which the lug 82 acts on the lug 80 of the catch-plate 76 engaged with the lug 81 of the end-cap 68. This causes rotation of the barrel 66 with the shaft 58, the spool 72 being restrained from rotation by the lug 80 of the catch-plate 78 interposed between the lug 84 of the spool-part 74 and the lug 83 of the stationary flange 71.

Figure 8B:
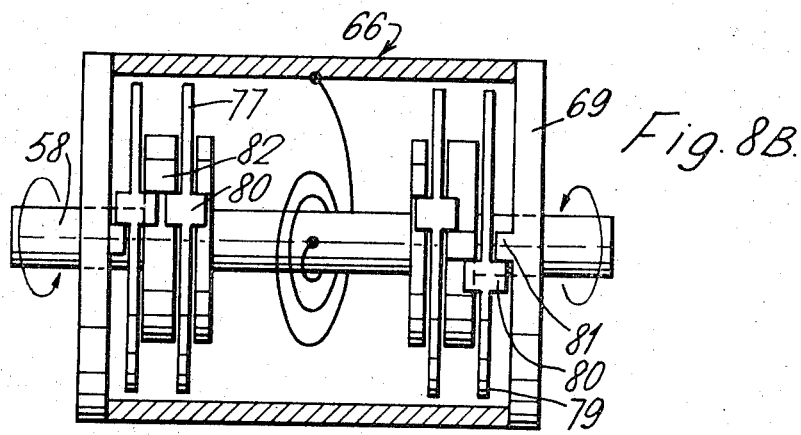
Figure 8C:
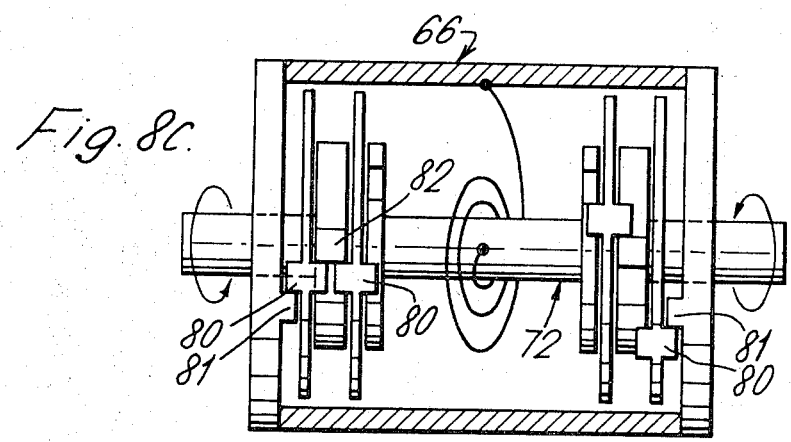

Rotation of the shaft 58 and barrel 66 together continues with regime illustrated in FIG. 8A up to approximately 300 degrees, whereupon, as illustrated in FIG. 8B, the lug 82 engages with the lug 80 of the catch-plate 77 and the lug 81 of the end-cap 69 engages with the lug 80 of the catch-plate 79. Further rotation of the shaft 58 to complete one revolution brings about the regime illustrated in FIG. 8C.

Figure 8D:
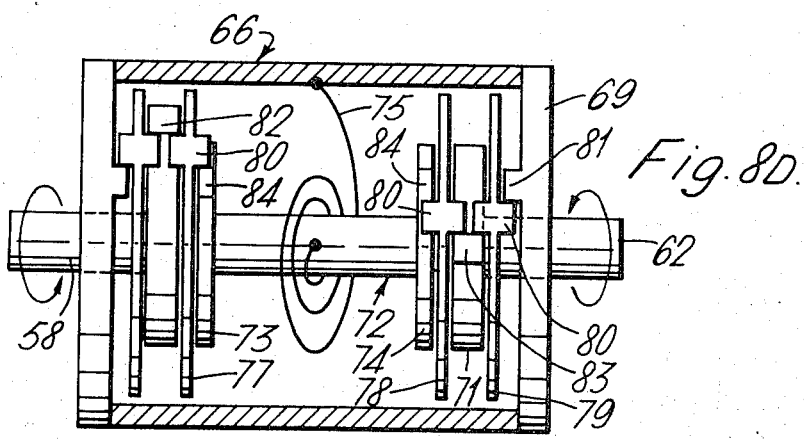

Continued rotation of the shaft 58 to some 640 degrees from its initial position brings about the regime illustrated in FIG. 8D. In this the lug 80 of the catch-plate 79 engages with the lug 83 of the stationary flange 71, and the lug 80 of the catch-plate 77 engages with the lug 84 of the spool-part 73. Further rotation of the shaft 58 in the same sense relative to the shaft 62 is not possible; the spool 72 is restrained from rotation in this sense by the lug 80 of the catch-plate 78 interposed between the lug 84 of the spool-part 74 and the lug 83 of the flange 71, and the barrel 66 is restrained from rotation in the same sense by the lug 80 of the catch-plate 79 interposed between the lug 81 of the end-cap 69 and the lug 83 of the flange 71.

The lost-motion device returns to the normal regime illustrated in FIG. 6 if during either of the wind-up sequences illustrated in FIGS. 7A to D and 8A to D, the torque-loading falls below the threshold level set by the preloading of the spring 75. The return is made under the action of the spring 75, and eleminates any relative rotational displacement between the shafts 58 and 62 by causing rotation of each shaft 58 and 62 to the same extent as, but in the opposite sense, to the experienced during the winding-up operation.

Referring now more particularly to FIG. 4, any rotational displacement of either shaft 58 and 62 relative to the other is transformed into an axial displacement of a collar 86 screwed on the shaft 62. The collar 86 is engaged by two arms 87 that are carried with the shaft 58, each arm 87 extending the length of the lost-motion device to enter, in sliding-fit, a respective hole 88 in a flange 89 of the collar 86. Any rotation of the shaft 58 relative to the shaft 62 is accordingly transferred to the collar 86, and the sense of the resultant axial displacement of the collar 86 along the shaft 62 depends upon the sense of this relative rotation. The extent of the axial displacement provides a measure of the rotational displacement between the shafts 58 and 62.

Axial displacement of the collar 86 is effective to actuate an electrical switch 90 (providing the switch 20 of FIG. 1) connected in the electrical energization circuit of the electromagnetic clutch. The switch 90 has two feeler-arms 91 that are biased resiliently to adopt spaced positions on opposite sides of a pivoted lever 92. The lever 92 has a pin 93 that is retained within a circumferential guide 94 of the collar 86 such that the lever 92 pivots from a normal, central position by an extent dependent upon the axial displacement of the collar 86 along the shaft 62. The pivotal displacement of the lever 92 is of a sense dependent upon the sense of axial displacement of the collar 86, and, if sufficient, produces displacement of one or the other of the two feeler-arms 91, the particular one being dependent upon the sense of axial displacement of the collar 86. The switch 90 is actuated in response to displacement of either feeler-arm 91, and the spacing between the arms 91 is set such that actuation occurs when there is a rotational displacement of some 600 degrees between the shafts 58 and 62.

The switch 90 is accordingly actuated only in the event that torque-loading in excess of the threshold set by the preloading of the spring 75, is sustained on the torque-switch for long enough to result, through the lost-motion device, in a rotational displacement between the shafts 58 and 62 of some 600 degrees. Actuation of the switch 90 breaks the supply of energization current to the coil 52 of the electromagnetic clutch and the consequent disengagement of this clutch breaks the coupling through the assembly and thereby releases the loading. Although the switch 90 is no longer actuated after release of the loading, supply of current to the coil 52 and consequent engagement of the clutch, is reestablished only in response to a reselection operation performed by the pilot of the aircraft.

In the assembly described above only one cut-out switch, namely switch 90, is shown, but there are in fact three such switches and these are set to be actuated at different angles of rotational displacement between the shafts 58 and 62. The three switches, individually and in pairs, are effective in the energization circuit of the electromagnetic clutch for different modes of flight of the aircraft, and thereby enable different degrees of transient-tolerance to be used for different modes.

We claim:

1. A lost-motion coupling device comprising two rotatably-mounted coupling-parts, two intermediate members, means mounting the two intermediate members for rotation independently on one another and said two coupling-parts, first catch means rotatably-mounted to act between a first of said coupling-parts and said two intermediate members, said first catch means having abutments engageable by said intermediate members for carrying said first catch means with the respective intermediate members into driving engagement with said first coupling-part, second catch means rotatably-mounted to act between the second coupling-part and said two intermediate members, said second catch means having abutments engageable by said intermediate members for carrying said second catch means with the respective intermediate members into driving engagement with said second coupling-part, and spring means coupled to both said intermediate members for urging relative rotation between them to bring each into engagement with the said abutments of said first and second catch means and thereby establish driving interconnection of said first and second coupling-parts via said catch means and intermediate members, said driving interconnection being broken to allow relative rotation between the two coupling-parts only in response to torque applied between them sufficient to overcome the action of said spring means.

2. A lost-motion coupling device according to claim 1 wherein said first catch means comprises two rotatably-mounted catch-plates to act between said first coupling-part and said intermediate members respectively, and said second catch means comprises two rotatably-mounted catch-plates to act between said second coupling-part and said intermediate members respectively.

3. A lost-motion coupling device according to claim 1 wherein one of said intermediate members is a cylindrical barrel and the other a spool mounted within the barrel, and wherein said spring means is a spiral spring embracing the spool within the barrel, said spring having its two ends attached to the spool and barrel respectively.

4. A lost-motion coupling device according to claim 3 wherein said first and second coupling-parts are two rotatably-mounted shafts that extend into said barrel from opposite ends.

5. A lost-motion coupling device according to claim 4 wherein said catch means are contained within the barrel.

6. An assembly comprising a lost-motion coupling device according to claim 1, actuable means, and means responsive to a predetermined extent of relative rotation between said first and second coupling-parts to actuate said actuable means.

7. An assembly according to claim 6 including a clutch coupled in series with said lost-motion coupling device.

8. In an automatic control system that comprises a drivable output member, and a servo control-channel for driving said output member, a lost-motion coupling device according to claim 1 coupled to said output member for applying drive from said servo control-channel to said output member.

9. An automatic control system comprising a drivable output member of the system and a multiplex control-channel for driving said output member, said control-channel being formed by a plurality of sub-channels for providing nominally-equivalent output drives to the output member, and wherein each sub-channel includes a lost-motion coupling device according to claim 1 for applying the output drive of the respective sub-channel to said output member.

10. An automatic control system according to claim 9 wherein each sub-channel includes a selectively-disengageable clutch coupled in series with the lost-motion coupling device of the respective sub-channel, and means for disengaging the clutch in response to relative rotation of predetermined extent between said first and second coupling-parts of this lost-motion coupling device.

11. A lost-motion coupling device comprising first and second coupling-parts, means mounting the two coupling-parts for rotation independently of each other about a common axis, each said coupling-part having an abutment-portion spaced radially from said axis, and said mounting means mounting the two coupling-parts with the two abutment-portions spaced apart lengthwise of said axis, a spool-member mounted between the said abutment-portions for rotation about said axis, said spool-member having first and second abutment-portions both spaced radially from said axis, a barrel-member mounted for rotation about said axis, said barrel-member having first and second abutment-portions that are both spaced radially from said axis and are spaced apart lengthwise of said axis with the said abutment-portions of said first and second coupling-parts therebetween, spring means acting between said spool-member and said barrel-member to urge rotation of said spool-member in a first sense about said axis and said barrel-member in a second, opposite sense, four catch-plates, means mounting a first of the catch-plates to engage between the first abutment-portion of said spool-member and the abutment-portion of said first coupling-part for arresting rotation of said spool-member relative to said first coupling-part in said first sense, means mounting a second of the catch-plates to engage between the first abutment-portion of said barrel-member and the abutment-portion of said first coupling-part for arresting rotation of said barrel-member relative to said first coupling-part in said second sense, means mounting a third of the catch-plates to engage between the second abutment-portion of said spool-member and the abutment-portion of said second coupling-part for arresting rotation of said spool-member relative to said second coupling-part in said first sense, and means mounting the fourth catch-plate to engage between the second abutment-portion of said barrel-member and the abutment-portion of said second coupling-part for arresting rotation of said barrel-member relative to said second coupling-part in said second sense.

12. A lost-motion coupling device according to claim 11 wherein said first and second coupling-parts are two rotatably-mounted shafts, and each said shaft has a flange that carries a radially-extending lug.

13. A lost-motion coupling device according to claim 12 wherein said spool-member has two flanges that each carry a radially-extending lug.

14. A lost-motion coupling device according to claim 13 wherein each said catch-plate has a transversely-extending lug.

15. A lost-motion coupling device according to claim 11 wherein said spring means is a spiral spring.

16. An assembly comprising a lost-motion coupling device according to claim 11, actuable switch-means, and means responsive to a predetermined extent of relative rotation between said first and second coupling-parts to actuate said switch-means.

17. An assembly according to claim 16 including a clutch coupled in series with said lost-motion coupling device.

18. In an automatic control system that comprises a drivable output member, and a servo control-channel for driving said output member, a lost-motion coupling device according to claim 11 coupled to said output member for applying drive from said servo control-channel to said output member.

19. An automatic control system comprising a drivable output member of the system and a multiplex control-channel for driving said output member, said control-channel being formed by a plurality of sub-channels for providing nominally-equivalent output drives to the output member, and wherein each sub-channel includes a lost-motion coupling device according to claim 11 for applying the output drive of the respective sub-channel to said output member.

20. An automatic control system according to claim 19 wherein each sub-channel includes a selectively-disengageable clutch coupled in series with the lost-motion coupling device of the respective sub-channel, and means for disengaging the clutch in response to relative rotation of predetermined extent between said first and second coupling-parts of this lost-motion coupling device.

References Cited

UNITED STATES PATENTS 2,099,359 11/1937 Woodeson et al. _____ 64—15
2,618,137 11/1952 White.
2,722,846 11/1955 McDonald _____ 192—55 XR CARLTON R. CROYLE, Primary Examiner A. D. HERRMANN, Assistant Examiner U.S. Cl. X.R.
64—15, 27; 244—77